March 8, 1932.                R. J. STATZ                1,848,280
                          BRAKE OPERATING DEVICE
                           Filed Oct. 16, 1929
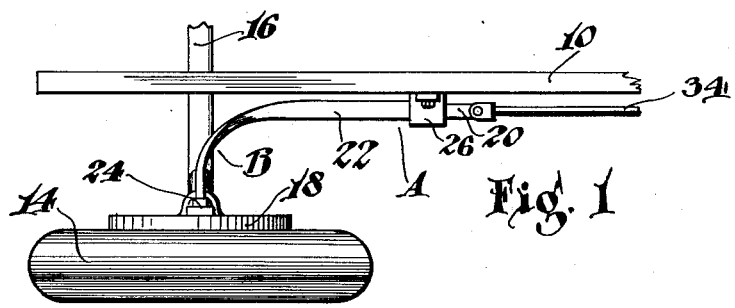
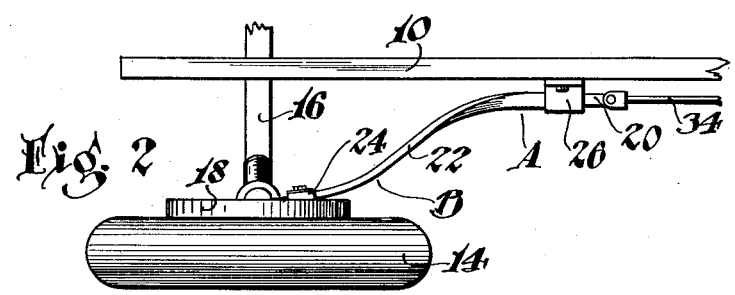
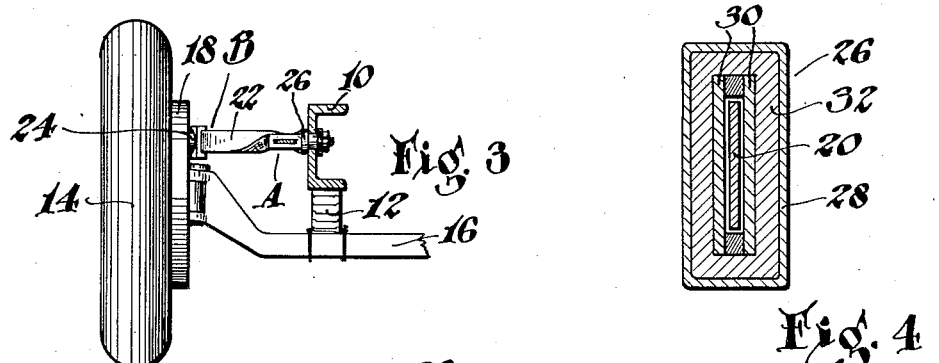
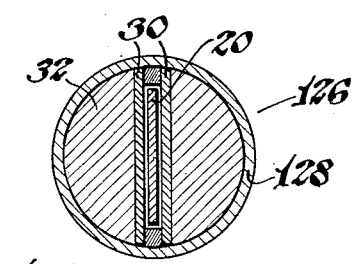
INVENTOR
Robert J. Statz
BY
ATTORNEY

Patented Mar. 8, 1932

1,848,280

UNITED STATES PATENT OFFICE

ROBERT J. STATZ, OF SOUTH BEND, INDIANA, ASSIGNOR TO BENDIX BRAKE COMPANY, OF SOUTH BEND, INDIANA, A CORPORATION OF ILLINOIS

BRAKE OPERATING DEVICE

Application filed October 16, 1929. Serial No. 400,144.

This invention relates to brakes, and is illustrated as embodied in an automobile chassis. An object of the invention is to provide simple operating means for the brake, preferably including a steel ribbon or the equivalent, which will not interfere with movement of the chassis on its supporting springs or with swiveling or other movement of the wheel. Having this object in view, the ribbon or ribbonlike tension element is arranged so that one portion (e. g. that adjacent the chassis) is generally horizontal so that it will readily flex to compensate for relative vertical movement of the chassis and wheel due to deflections of the springs, while another portion (e. g. that adjacent the wheel) is arranged generally vertical to compensate for swiveling movement of the wheel. This obviates any widthwise flexing of the ribbon, such as has been one of the defects of prior arrangements of ribbonlike operating members for vehicle brakes. Preferably the ribbon is housed in a flexible conduit secured at its ends respectively to the brake and the chassis, thus forming in effect a Bowden-type operating device.

The above and other objects and features of the invention, including various novel and desirable details of construction, will be apparent from the following description of the illustrative embodiments shown in the accompanying drawings, in which:

Figure 1 is a top plan view of the left front wheel and adjacent parts, with the brake-operating tension element brought in substantially perpendicular to the brake backing plate;

Figure 2 is a similar view, with the tension element brought in at an acute angle;

Figure 3 is a vertical section showing the parts of Figure 2 in rear elevation;

Figure 4 is a section through the brake-operating device; and

Figure 5 is a section through an alternative form of operating device.

In Figures 1–3, the frame or chassis of the car is shown at 10, and is supported by the usual springs 12 on axles carried by road wheels 14, the front axle 16 being shown with the road wheels swiveled in the usual manner at its ends. Each wheel is provided with a brake 18.

The present invention relates to the operating means of the brake, and to its arrangement to compensate for deflections of springs 12 and for swiveling of wheels 14. I prefer to use as the immediate operating element for the brake a ribbonlike tension member 20, shown as a steel ribbon. This ribbon enters the brake at right angles (Figure 1) or at an oblique angle (Figure 2), and is connected to the usual operator forming part of the brake proper and which is not here illustrated.

Preferably the ribbon 20 is housed in a flexible conduit 22, secured at one end to a bracket 24 forming part of the brake and at its other end to a bracket 26 carried by the chassis. As shown in Figure 4, the conduit 26 may include an outer sheath 28 and guides 30 between which the ribbon slides and which are separated by a packing 32 which may be saturated with lubricant, some of which seeps gradually through the joints at top and bottom to the ribbon. As shown in Figure 5, I may use a conduit 126 having an outer sheath 128 cylindrical in form. This arrangement forms one type of so-called "Bowden control", maintaining a fixed distance measured along the ribbon between brackets 24 and 26 regardless of movements of the chassis, the axle, or the wheel. Ribbons 20 may be connected to the usual brake rods 34.

According to an important feature of the invention, widthwise flexing of the ribbon is eliminated by having one portion (e. g. the portion "A" adjacent the chassis) horizontally arranged, while another portion (e. g. the portion "B" adjacent the wheel) is vertically arranged. Thus vertical flexure is confined to portion "A" while horizontal flexure takes place in portion "B", and at no time is there any widthwise flexing of the ribbon.

While one illustrative arrangement has been described in detail, it is not my intention to limit the scope of the invention to that particular arrangement, or otherwise than by the terms of the appended claims.

I claim:

1. Operating mechanism for a brake on a wheel swiveled adjacent to and arranged to support a chassis and which comprises a ribbon-like tension element supported at the brake and on the chassis and one portion of which is arranged generally in a horizontal plane to compensate for relative vertical movement of the chassis and wheel, and another portion of which is arranged generally in a vertical plane to compensate for swiveling movement of the wheel.

2. Operating mechanism for a brake on a wheel arranged to support a chassis and which comprises a ribbon-like tension element supported at the brake and on the chassis and one portion of which is arranged generally in a horizontal plane and another portion of which is arranged generally in a vertical plane.

3. Operating mechanism for a brake on a wheel swiveled adjacent to and arranged to support a chassis and which comprises a ribbon-like tension element supported at the brake and on the chassis and one portion of which is arranged generally in a horizontal plane to compensate for relative vertical movement of the chassis and wheel, and another portion of which is arranged generally in a vertical plane to compensate for swiveling movement of the wheel, together with a flexible conduit housing said element and having its ends secured respectively adjacent the brake and on the chassis.

4. Operating mechanism for a brake on a wheel arranged to support a chassis and which comprises a ribbon-like tension element supported at the brake and on the chassis and one portion of which is arranged generally in a horizontal plane and another portion of which is arranged generally in a vertical plane, together with a flexible conduit housing said element and having its ends secured respectively adjacent the brake and on the chassis.

5. A Bowden-type operating device comprising a ribbon-like tension element, in combination with an externally-cylindrical flexible housing therefor having a rectangular-section central opening.

6. A brake operating mechanism comprising a swivelled member, a vertically movable member and a ribbon-like tension element twisted and supported between the members.

7. A brake operating mechanism comprising a swivelled member, a vertically movable member and a ribbon-like tension member twisted and having one end supported on the swivelled member and its other end supported on the vertically movable member.

8. A brake operating mechanism comprising a swivelled member, a vertically movable member and a ribbon tension member having its ends turned ninety degrees with respect to each other and connected respectively to the swivelled member and the vertically movable member.

In testimony whereof, I have hereunto signed my name.

ROBERT J. STATZ.